Patented Mar. 3, 1953

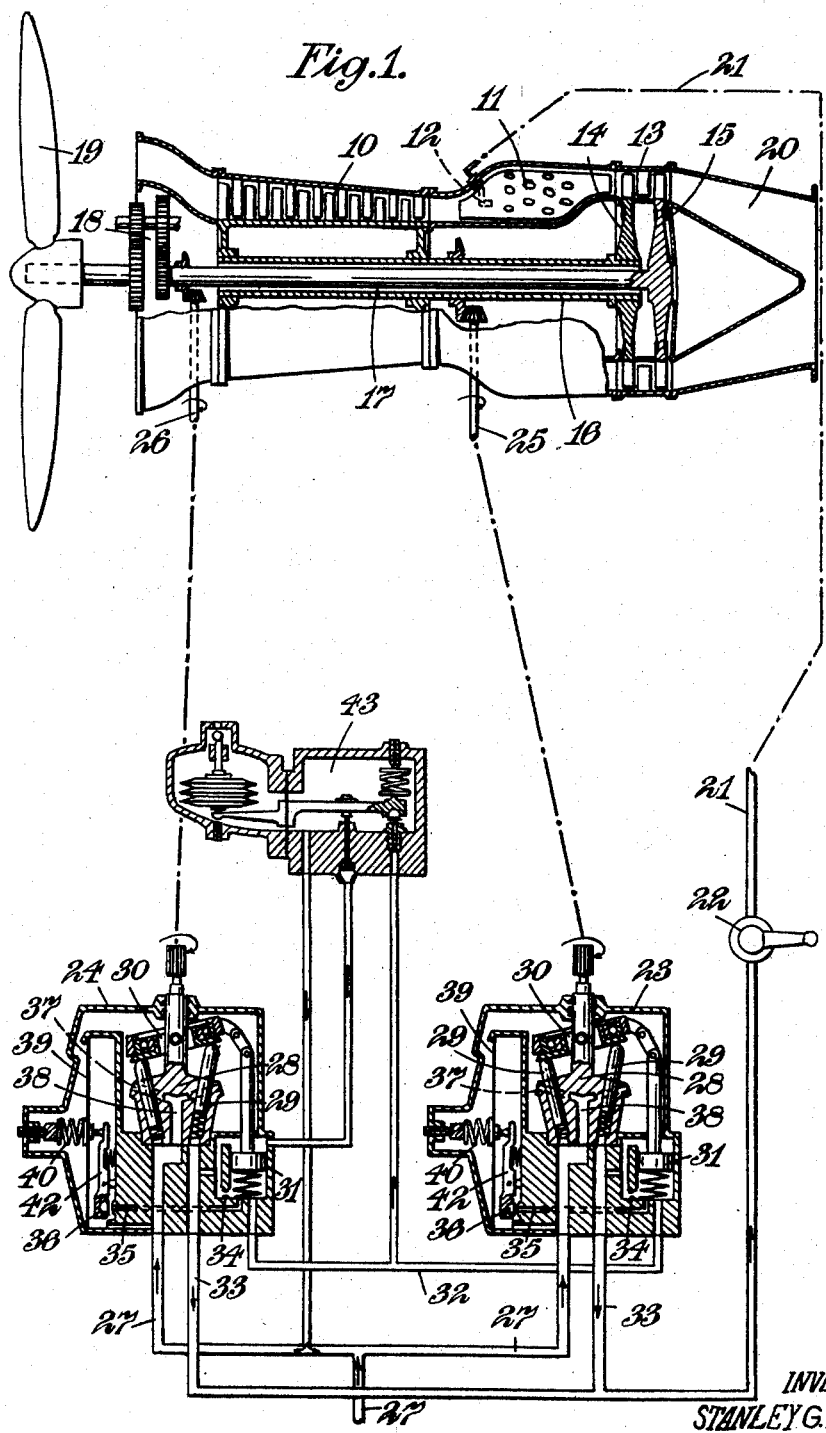

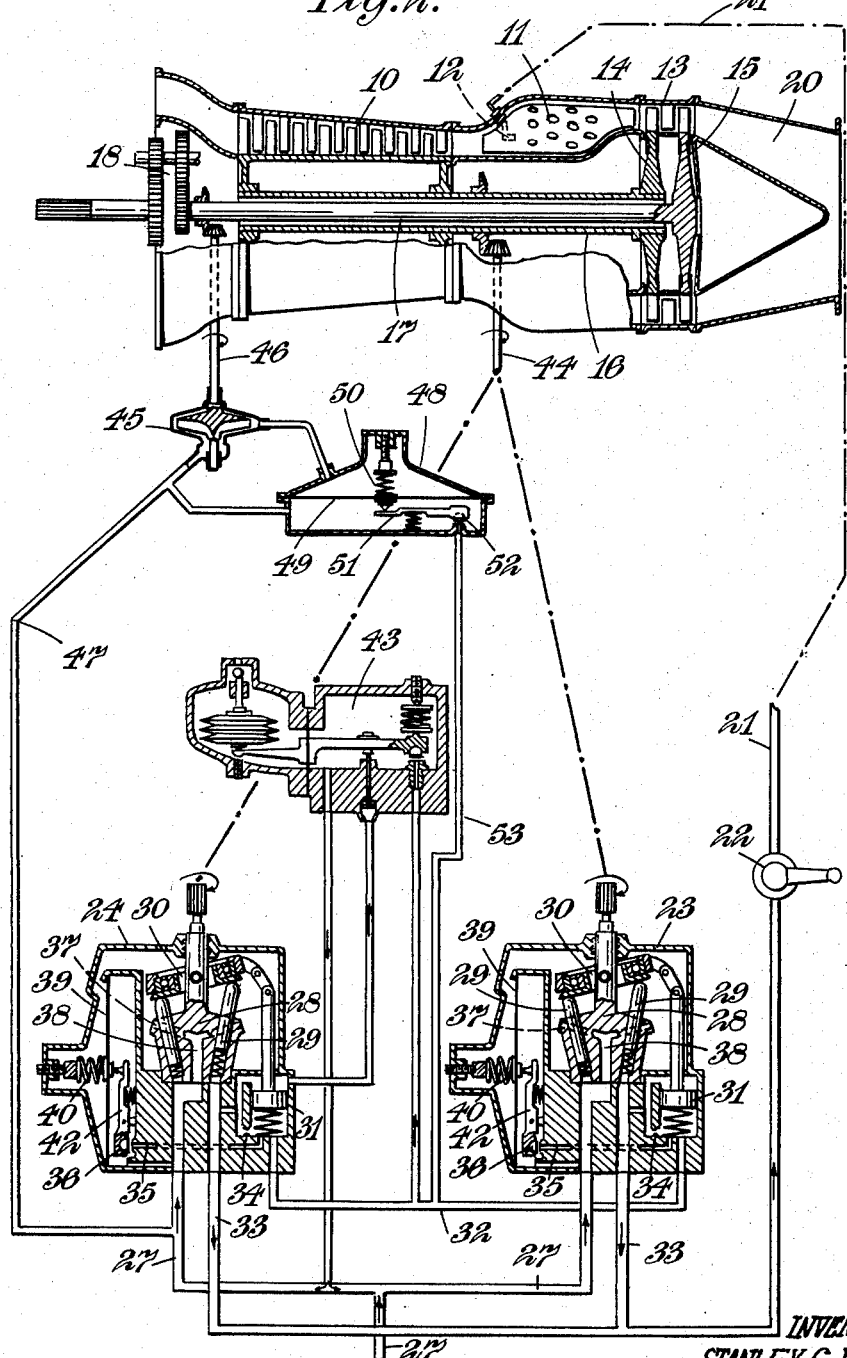

2,629,982

UNITED STATES PATENT OFFICE 2,629,982

FUEL SYSTEM FOR GAS-TURBINE ENGINES

Stanley George Hooker, Duffield, Derby, England, assignor to Rolls-Royce Limited, Derby, England, a British company Application January 19, 1948, Serial No. 3,057
In Great Britain January 23, 1947

2 Claims. (Cl. 60—39.16)

This invention relates to fuel-systems for gas-turbine engines. Such engines comprise a compressor-system, combustion equipment to which air is delivered from the compressor system and in which fuel is burnt in the air, and a turbine system driven by the combustion products flowing through it and driving the compressor. The invention is particularly though not exclusively applicable to gas-turbine-engines used for aircraft-propulsion, in which the engine drives an airscrew or a ducted fan, or the propulsive force is derived from the jet-reaction of the exhaust gases ejected rearwardly with respect to the direction of flight, or both systems are used conjointly.

The invention is concerned with gas-turbine-engines of the kind in which the turbine-system comprises two or more independent rotors which may constitute a multi-stage turbine; these rotors share the load between them of driving the compressor system and in some cases the load associated with external shaft power. For example, an engine of the above kind may comprise a two-stage turbine having high-pressure and low-pressure stages; the rotors associated with these stages are independent, the high-pressure rotor driving a high-pressure section of the compressor-system, and the low-pressure rotor driving the low-pressure section and possibly also driving an airscrew or ducted fan, in the case of an aircraft-engine. Another form of engine of the kind referred to may comprise a high-pressure turbine driving the compressor-system, and a low-pressure turbine with a rotor independent of that of the high-pressure turbine driving an airscrew or other load.

The present invention has for an object to provide a fuel-system for such engines, which will present desirable features from the point of view of safety in operation.

According to the present invention, in a gas-turbine-engine of the kind referred to, a speed-governing device is provided for each rotor to be responsive to the rotational speed of that rotor, and the speed-governing devices are each operative to control the fuel-delivery to the combustion equipment. Preferably, each speed-governing device is responsive at a pre-selected maximum rotational speed of its associated rotor to reduce the fuel-delivery to the combustion equipment, whereby in the event that any of the independent rotors tends to over-speed the fuel-delivery to the combustion equipment is reduced thereby avoiding damage to the engine due to excessive rotational speeds.

According to a feature of this invention, in a gas-turbine-engine of the kind referred to, there is provided a variable-delivery liquid-fuel pump delivering fuel to the combustion equipment and having a hydraulic servo-system to control the fuel-delivery, and a centrifugal speed-governing device associated with each rotor and operative, when a pre-selected rotational speed of that rotor tends to be exceeded, to control the servo-system to reduce the fuel-delivery by the pump. The centrifugal speed-governing means is conveniently in the form of centrifugal impeller driven from the associated rotor and the pressure head developed by the impeller is employed to control the servo-system of the fuel pump.

According to one preferred construction of this invention each independent rotor drives an associated liquid-fuel pump, the fuel-pumps are arranged to deliver through a common fuel-delivery system to the combustion equipment, and the speed-governing devices associated with the rotors are each operative to control the fuel-delivery of the common delivery system.

Moreover, in such a construction, it is preferred that the pumps are of the variable-delivery kind and are controlled as to delivery by a common hydraulic servo-system, and that the speed-governing devices are operative upon the common hydraulic servo-system to control the fuel-delivery of the common delivery system. Thus in the event that any of the independent rotors of the engine tends to exceed a preselected speed, the delivery to the common fuel-delivery system will be reduced. It is convenient to employ in this arrangement a variable-delivery pump of the kind in which the pump rotor acts as a centrifugal impeller to govern the speed at which the pump rotor is driven.

According to another preferred construction, there is provided a plurality of fuel-pumps delivering to a common fuel-delivery system and driven by one of the rotors, a hydraulic servo-system common to and controlling the delivery of said pumps, and a centrifugal impeller device independent of the pumps driven by another rotor and arranged so that the pressure head developed by the impeller can control the servo-system of the fuel-pumps. In such a construction, the centrifugal impeller device is conveniently arranged to control the servo-system by the pressure head being applied to a diaphragm device actuating a bleed valve in the hydraulic servo-system thereby controlling the fuel-delivery from the pumps.

There will now be described by way of example of this invention, two constructions of gas-turbine-engine having two independent turbine rotors arranged to control the fuel-delivery to the combustion equipment so that when either of the rotors overspeeds the fuel-delivery is reduced.

In the following description reference is made to the accompanying diagrammatic drawings in which the same reference numerals are applied to like parts and in which Figure 1 illustrates one construction, and
Figure 2 illustrates the second construction.

Referring to Figure 1, the gas-turbine-engine comprises an axial compressor 10 delivering air under pressure to a plurality of combustion chambers 11, to which liquid fuel is supplied by burners or injection nozzles 12. The fuel is burnt in the air and the products of combustion pass to a two stage turbine 13 having independent turbine rotors 14, 15. The turbine rotor 14 is connected by a hollow shaft 16 to the rotor drum of the compressor, the shaft running through the centre of the combustion equipment. The turbine rotor 15 drives a shaft 17 which is coaxial with the shaft 16 and is connected through suitable gearing 18 to external load indicated as an airscrew 19 which conveniently is of the variable-pitch type. The exhaust gases leave the turbine through a suitable exhaust assembly 20.

Fuel is supplied to the burners 12 of the combustion equipment through a supply pipe 21, in which is located a throttle 22, from a pair of variable-delivery multiple-plunger fuel-delivery pumps 23, 24 which are of a well-known or any convenient construction.

The fuel-pump 23 is driven by the shaft 16 through a suitable transmission 25 and the fuel-pump 24 is driven independently from the shaft 17 through a suitable transmission 26. The transmissions 25, 26 are preferably so arranged that the rotational speeds of the pumps are substantially the same.

The fuel-pumps 23, 24 (which may be duplicated if desired) are in effect connected in the fuel system in parallel between the fuel-inlet pipe 27 and the common fuel supply pipe 21 to the burners 12.

Each pump comprises a rotor 28 in which a plurality of reciprocable plungers 29 are located and the stroke of the plungers is varied by means of a swash plate 30, cam plate or the equivalent, the angle of inclination of which is controlled by a servo-mechanism 31 of the piston and cylinder type. The pistons of the two servo-mechanisms 31 are spring biassed in one direction and the like ends of the two cylinders are connected together, one pair of ends by pipe 32 and the other ends through the delivery pipes 33. The upper sides of the piston are subject to fuel-delivery pressure which thus opposes the spring bias and the opposite sides of the pistons are in communication with the fuel-delivery side of the pump through a restricted orifice 34. The undersides of the pistons are connected to the suction side of the fuel-pumps by a normally closed duct 35, flow through which is controlled by a plate valve 36. It will be clear that since the servo-mechanisms 31 are connected together they form a common servo-system so that variations in the swash plate angle in one pump are followed by like variations in the swash plate angle of the other pump.

Each pump rotor 28 is formed with radial drillings 37 communicating through a central duct 38 with the suction side of the pump, so that the rotor acts as a centrifugal pump delivering to one side of a diaphragm 39 loaded by a helical spring 40 in tension. The opposite side of the diaphragm is connected to the suction side of the pump. The operation of this speed-governing mechanism, as is well known, is to limit the pump output and therefore the speed at which the pump is driven to a preselected maximum value. When this value of the pump speed tends to be exceeded the diaphragm contacts a rocking lever 42 to open the plate valve 36 to allow fuel to flow from below the piston so that the angle of inclination of the swash plate 30 and the plunger strokes are reduced.

As above mentioned in this construction according to the invention, the pump 23 is driven from one turbine rotor 14 and the pump 24 is driven from the independent turbine rotor 15. The pump 23 will therefore be adjusted so that when the turbine rotor 14 tends to exceed its maximum permissible speed the plate valve 36 of pump 23 will be opened, and the pump 24 will be adjusted so that when the turbine rotor 15 tends to exceed its permissible speed the plate valve 36 of the pump 24 will be opened. It will thus be seen that if either of the turbine rotors 14, 15 tends to exceed its maximum permissible speed the fuel-delivery of both pumps 23, 24 will be reduced thus reducing the delivery to the burners 12 of the combustion equipment through the common fuel supply pipe 21.

The hydraulic system common to the two pumps 23, 24 also includes a barometric pressure control device 43 of any known or convenient construction to vary the fuel-delivery of the pumps in accordance with variations in atmospheric pressure.

In the alternative arrangement, illustrated in Figure 2, both fuel pumps 23, 24 are driven from the same turbine rotor 14 through a suitable transmission 44. It will be appreciated, however, that a single pump could be provided although it is preferred to provide two pumps in order to ensure a high rate of delivery and that in the event of failure of one pump an adequate supply of fuel will be obtained from the other pump. Both pumps will be similarly adjusted so that in the event of the turbine rotor 14 tending to exceed its maximum permissible rotational speed the delivery of the pumps to the burners 12 will be reduced.

The turbine rotor 15 in this case in addition to driving an external load, such as a variable-pitch airscrew, is arranged to drive a centrifugal pump 45 through a suitable transmission 46. The inlet to the pump is connected by a pipe 47 to the suction side of the pumps 23, 24 and the delivery side of the pump 45 is connected to one side of a diaphragm device 48. The other side of the device 48 is connected to the inlet side of the centrifugal pump 45 so that the diaphragm 49 is subjected to a pressure load which varies in accordance with the rotational speed of the turbine rotor 15. As this pressure increases, the diaphragm 49 is displaced against the tension of a helical spring 50 and at a preselected speed of the rotor 15, viz, the maximum permissible speed of the rotor, the diaphragm 49 is arranged to rock a lever 51 to open a plate valve 52 controlling a bleed 53 from the pipe 32 connecting the undersides of the pistons of the servo-mechanisms 31. This action effects a reduction in the delivery of the pumps 23, 24 to the burners of the combustion equipment.

It will be seen therefore that as in the previous construction, when either of the turbine rotors 14, 15 tends to exceed its maximum permissible speed, the fuel-delivery to the combustion equipment is reduced.

It will be appreciated that the invention provides for limiting the maximum rotational speed of each of the turbine-rotors in accordance with its own independent limitations; such feature is of particular advantage, where, as in the constructions described, an airscrew is driven by one of the rotors, which airscrew is subjected to varying load as a result of change of pitch-setting and/or varying flight conditions. In the case of failure of the airscrew-control-system, the pitch would normally tend to adjust itself rapidly to a fine-pitch setting thus reducing the load on the turbine driving it, which will therefore tend to overspeed. The invention will obviate serious damage of the engine arising from such a failure.

Also in normal operation, particularly where a constant-speed-unit of the airscrew is mechanically connected to a throttle-valve in the common fuel-supply, the characteristics of the independent rotors during acceleration may differ, and in addition the rate of response of the constant-speed-unit causing pitch-change may be such as to cause rapid acceleration of the turbine rotor driving it; the overspeed governor system outlined above will prevent such overspeeding of the rotor.

I claim:

1. A gas-turbine engine comprising a first turbine having a first turbine rotor; a second turbine having a second turbine rotor rotatable independently of said first turbine rotor; combustion equipment common to said turbines and arranged to deliver products of combustion thereto; fuel pump means driven by at least one of said rotors, said fuel pump means comprising a plurality of fuel pumps of the variable capacity kind; delivery ducting from said fuel pump means to said combustion equipment; adjusting means to adjust the fuel supplied through said ducting; a first speed governing device driven by said first turbine rotor and responsive to a preselected maximum rotational speed of said first turbine rotor; a second speed governing device driven by said second turbine rotor and responsive to a preselected maximum rotational speed of said second turbine rotor; a fluid pressure servo system common to all of said pumps for defining the capacities thereof in unison in accordance with the pressure in said servo system, and valve means actuated by each of said speed governing devices to control the pressure in said servo system; whereby the fuel supply to said combustion equipment is reduced in the event of either one of said rotors alone reaching its preselected maximum rotational speed.

2. A gas-turbine engine comprising a first turbine having a first turbine rotor; a second turbine having a second turbine rotor rotatable independently of said first turbine rotor; combustion equipment common to said turbines and arranged to deliver products of combustion thereto; a fuel pump of the variable capacity kind driven by said first turbine rotor; a second fuel pump of the variable capacity kind driven by said second turbine rotor; delivery ducting from both said fuel pumps to a common fuel supply system to said combustion equipment; a first speed governing device driven by said first turbine rotor and responsive to a predetermined maximum rotational speed of said first turbine rotor; a second speed governing device driven by said second turbine rotor and responsive to a predetermined maximum rotational speed of said second turbine rotor; a fluid pressure servo system common to said pumps for defining the capacities thereof in unison in accordance with the pressure in said servo system and valve means actuated by each of said speed governing devices to control the pressure in said servo system whereby the fuel supply to said combustion equipment is reduced in the event of either one of said rotors alone reaching its preselected maximum rotational speed.

STANLEY GEORGE HOOKER.

REFERENCES CITED

The following references are of record in the file of this patent:

UNITED STATES PATENTS

| Number | Name | Date |
| --- | --- | --- |
| 2,219,994 | Jung | Oct. 29, 1940 |
| 2,238,905 | Lysholm | Apr. 22, 1941 |
| 2,255,439 | Schmidt | Sept. 9, 1941 |
| 2,371,889 | Hermitte | Mar. 20, 1945 |
| 2,372,686 | Sédille | Apr. 3, 1945 |
| 2,603,063 | Ray | July 15, 1952 |